(12) United States Patent
Degain et al.

(10) Patent No.: US 7,331,439 B2
(45) Date of Patent: Feb. 19, 2008

(54) MANUFACTURING PLANT FOR PARTS, PARTICULARLY VEHICLE BODY PARTS

(75) Inventors: Michael Degain, Grand Blanc, MI (US); Robert Long, Shelby Township, MI (US); Hans Moser, Erlingen (DE)

(73) Assignee: KUKA Schweissanlagen GmbH, Augsburg (DE)

( * ) Notice: Subject to any disclaimer, the term of this patent is extended or adjusted under 35 U.S.C. 154(b) by 321 days.

(21) Appl. No.: 10/548,614

(22) PCT Filed: Dec. 23, 2003

(86) PCT No.: PCT/EP03/14766

§ 371 (c)(1),
(2), (4) Date: Sep. 8, 2005

(87) PCT Pub. No.: WO2004/080645

PCT Pub. Date: Sep. 23, 2004

(65) Prior Publication Data

US 2006/0226197 A1 Oct. 12, 2006

(30) Foreign Application Priority Data

Mar. 12, 2003 (DE) .......................... 203 04 022 U

(51) Int. Cl.
 B23P 21/00 (2006.01)
 B62D 65/00 (2006.01)
 B23K 37/047 (2006.01)
(52) U.S. Cl. ................. 198/339.1; 29/430; 29/33 P; 29/791; 228/4.1; 228/6.1; 228/47.1

(58) Field of Classification Search ............... 198/575, 198/339.1, 346.2; 228/4.1, 47.1, 6.1; 29/430, 29/431, 33 P, 791
See application file for complete search history.

(56) References Cited

U.S. PATENT DOCUMENTS

| 4,441,645 A | * | 4/1984 | Takagishi et al. .......... 228/49.6 |
| 4,548,346 A | | 10/1985 | Kraus |
| 4,589,184 A | | 5/1986 | Asano |
| 5,548,096 A | * | 8/1996 | Akasaka et al. .......... 219/117.1 |
| 6,336,582 B1 | | 1/2002 | Kato et al. |
| 2002/0072825 A1 | | 6/2002 | Angel |
| 2003/0070272 A1 | * | 4/2003 | Zirbs ....................... 29/407.04 |

FOREIGN PATENT DOCUMENTS

DE  32 09 222 C2  9/1983

(Continued)

*Primary Examiner*—Mark A Deuble
(74) *Attorney, Agent, or Firm*—McGlew and Tuttle, P.C.

(57) ABSTRACT

A manufacturing plant (1) is provided for vehicle body parts (2, 3). The manufacturing plant includes a number of processing stations (4, 5, 6, 7, 8, 9, 10), which are situated one behind the other along a transfer line (22), and of a number of multiaxial robots (18, 19). In at least one processing station (4, 5, 6, 7, 8, 9, 10), one or more handling robots (18) for transporting parts is/are arranged on at least one axis of travel (20, 21). Next to the handling robot (18), one or more processing robots (19) is/are displaceably arranged on the same axis of travel (20). Working locations (11, 12) are arranged on both sides of a common axis of travel (20), whereby another common axis of travel can be provided on the rear side of the working locations.

9 Claims, 4 Drawing Sheets

FOREIGN PATENT DOCUMENTS

| | | |
|---|---|---|
| DE | 35 16 284 A1 | 6/1986 |
| DE | 44 22 380 A1 | 6/1995 |
| DE | 197 13 860 A1 | 10/1998 |
| DE | 298 04 850 U1 | 9/1999 |
| DE | 101 02 758 A1 | 7/2002 |
| GB | 2 145 642 A | 4/1985 |
| GB | 2 363 367 A | 12/2001 |

* cited by examiner

MANUFACTURING PLANT FOR PARTS, PARTICULARLY VEHICLE BODY PARTS

CROSS REFERENCE TO RELATED APPLICATIONS

This application is a United States National Phase application of International Application PCT/EP2003/014766 and claims the benefit of priority under 35 U.S.C. §119 of German Application DE 203 04 022.8 filed Mar. 12, 2003, the entire contents of which are incorporated herein by reference.

FIELD OF THE INVENTION

The present invention pertains to a manufacturing plant for components, especially body parts.

BACKGROUND OF THE INVENTION

Such a manufacturing plant is known from DE 298 04 850 U1. It comprises a plurality of processing stations or cells, which are arranged in a row along a transfer line. A central transport robot, which is designed as a stationarily positioned multiaxial articulated arm robot and transports the parts, is present within each cell. Within the cell, there are a plurality of work stations, at which the parts are processed, especially joined, by processing robots. The parts are transferred between the cells via intermediate storage units at the common cell boundaries. Relatively many robots are needed in such cells, and, moreover, these robots are not utilized optimally.

SUMMARY OF THE INVENTION

The object of the present invention is to provide an improved manufacturing plant.

According to the invention, a manufacturing plant is provided for components, especially body parts. The plant comprising a plurality of processing stations, which are arranged one after another along a transfer line and a plurality of multiaxial robots. One or more of the handling robots is provided for transporting the parts and are arranged in at least one processing station on at least one travel axis.

The arrangement of one or more handling robots on additional travel axes expands the working range and improves the operation as well as the ability to reach work stations, which are arranged as multiple work stations within one processing station. This is advantageous above all for a flexible manufacturing plant, in which different types of parts are processed in a preferably free mix, the work stations being related to the particular type. Despite the enlargement of the working range of the robot and the increase in the number of work stations, the number of handling robots needed can be kept low.

It is particularly advantageous if handling and processing robots are arranged next to one another on a common travel axis. As a result, processing and handling operations, especially transport operations, can take place simultaneously, and, moreover, a plurality of parts can be processed and/or handled simultaneously. Due to the common travel axis, the total number of robots needed can in turn be kept low. One or more robots may also have a dual function as a handling robot and as a processing robot.

The processing stations may be arranged separated from one another, in which case transfer points with intermediate storage units, buffer storage units or the like are formed in the transfer line. The transfer line may, moreover, branch out, which makes possible the better utilization of the individual processing stations. As a result, the preset cycle time and the flow of material can, in addition, be made flexible.

As an alternative, it is possible to arrange one or more common travel axes through a plurality of processing stations adjoining one another, as a result of which a smooth transfer from one station to the next is created. Such a design has, moreover, advantages in case of a high degree of making the manufacturing plant flexible. The design efforts and the transfer times between the individual stations are optimized.

The present invention is schematically represented as an example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
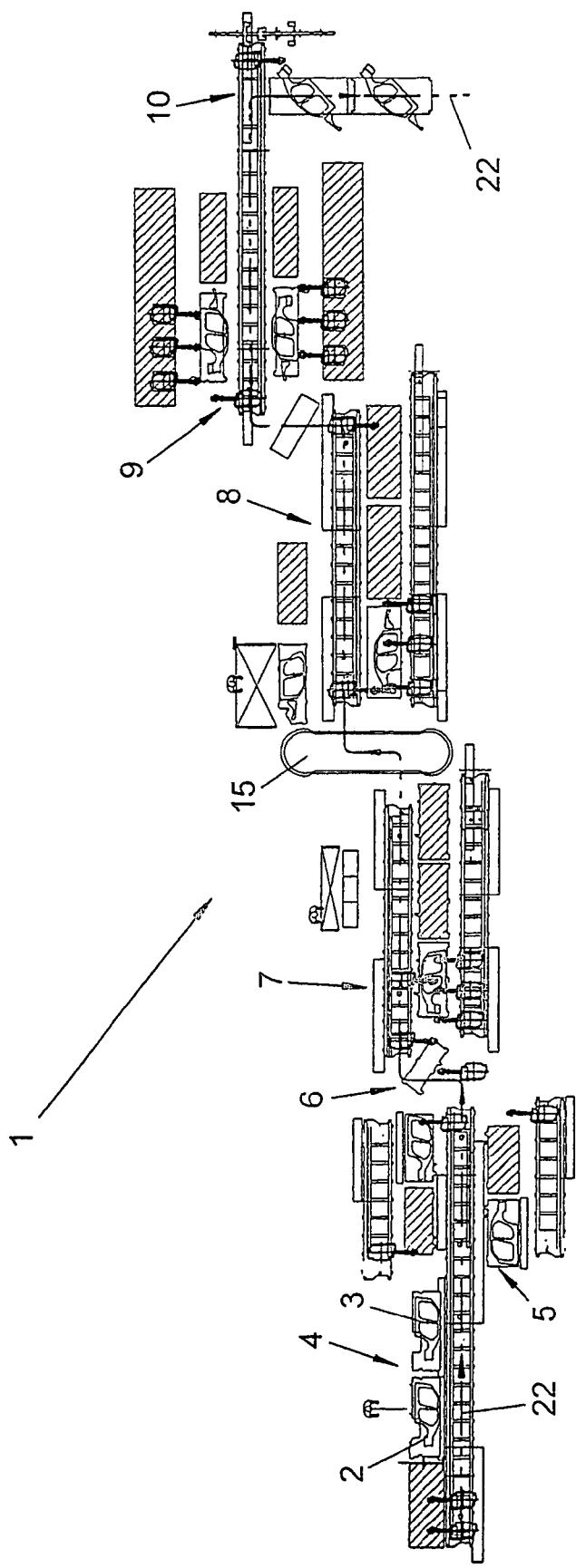
FIG. 1 is a top view of a manufacturing plant with a plurality of processing stations arranged one after another along a transfer line.

Referring to the drawings in particular, FIG. 1 schematically shows a top view of a manufacturing plant (1) for components (2, 3), which are preferably body parts of vehicle bodies, especially body shells. These may be, e.g., the shown side panels of a vehicle body. A plurality of different types of parts (2, 3) of the same kind can be preferably processed in the manufacturing plant (1) next to one another and preferably in a free mix. Two different types of parts (2, 3) are shown in the embodiment shown. Measures are taken here to also make it possible to process three or more or any other desired number of types of parts.

The manufacturing plant (1) comprises a plurality of processing stations (4 through 10), which are arranged one after another along a transfer line (22). The parts (2, 3) are processed in the individual stations (4 through 10) and then passed on from station to station. The transfer line (22) may have any desired shape and extension. It may have a linear design at least in some areas, in which case a plurality of processing stations, e.g., stations (4, 5), are arranged directly one after another in an aligned line. As an alternative, the transfer line (22) may also have kinks, in which case transfer points (13) with a change in the direction of conveying are formed, e.g., between the stations (5, 6, 7). Unlike in the simple exemplary embodiment being shown, it is, furthermore, possible for the transfer line (22) to branch out in some areas. As a result, e.g., two or more processing stations may be arranged in parallel next to one another and fed alternatingly from the transfer line. Such a design is suitable, for example, in case of cycle time-intensive stations, in which the processing takes longer than in the other stations. After the branching, the transfer line (22) may again unite in one line. A plurality of parallel transfer lines (22) are also possible in another modification.

A plurality of robots (18, 19) each, which are preferably multiaxial articulated arm robots, especially industrial robots with six axes, are arranged in the processing stations (4 through 10). At least some of the robots (18, 19) are arranged on an additional travel axis (20, 21) and can move on that axis through the individual processing stations (4, 5, 7, 8, 9). A plurality of robots (18, 19) are arranged next to one another on one travel axis (20, 21) at least in some areas.

The robots (18, 19) may have assigned task areas. These are handling robots (18), on the one hand, which perform transport and handling tasks. On the other hand, processing robots (19) are present, which carry out any processing of parts, e.g., joining operations. Many of the robots (19) are, for example, welding robots. One or more robot (18, 19) may have change couplings on the robot hand in order to change tools when needed. A handling robot (18) can also perform processing tasks in this case at the parts (2, 3) due to a tool change. The robots (18, 19) can be better utilized and offer an added economic value due to such a dual function of handling and processing.

Type-specific processing of the different parts (2, 3) is possible in different processing stations (4, 5, 7, 8, 9). A plurality of type-specific work stations (11, 12), which are designed, e.g., as type-specific part supports with special clamping devices, are present for this purpose in these processing stations (4, 5, 7, 8, 9). These work stations (11, 12) are arranged along the travel axes (20, 21) and can be operated jointly by the robots (18, 19).

At least one common travel axis (20), on which one or more handling robots (18) and one or more processing robots (19) are arranged next to one another, is arranged in one or more processing stations (4, 5, 7, 8, 9). The work stations (11, 12) are preferably arranged along this common travel axis (20), so that all robots (18, 19) can reach all work stations (11, 12). The common travel axis (20) preferably extends along the transfer line (22).

Furthermore, one or more additional travel axes (21), which preferably extend in parallel to the common travel axis (20) and on which one or more robots, preferably processing robots (19), are mounted movably, may be present in one or more processing stations (4, 5, 7, 8, 9).

The travel axes (20, 21) may have any desired suitable design. In the embodiment being shown, they are travel rails, which form the seventh robot axis. The robots (18, 19) have corresponding traveling gears for this. In addition, suitable positioning means are present to exactly position the robots at the work stations (11, 12).

Figure 2:
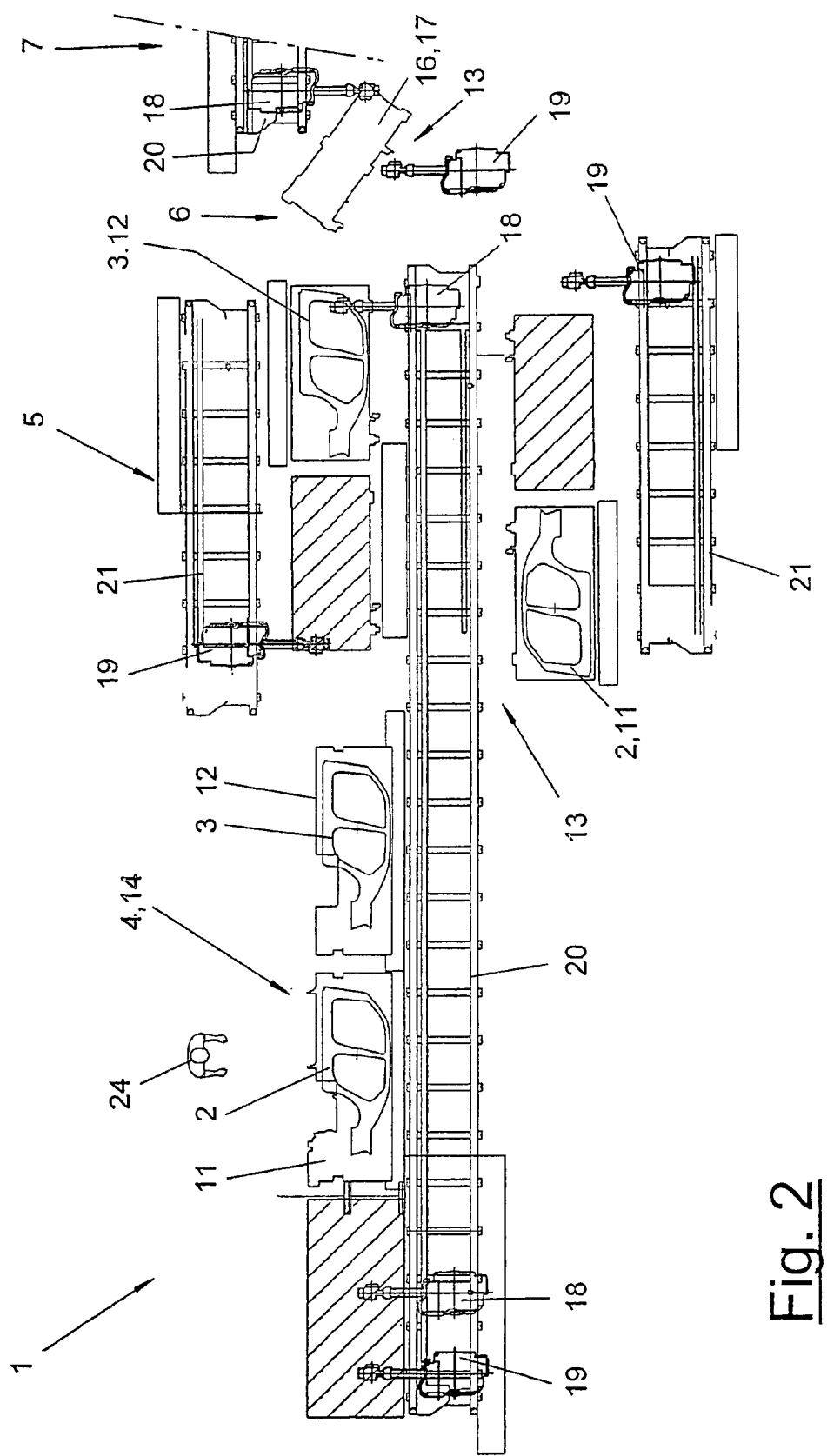
FIG. 2 is an enlarged and cut-away detail of an individual processing station from the manufacturing plant in FIG. 1.

FIG. 2 shows a top view of the entry area of the manufacturing plant (1). The first processing station (4) is designed as a loading station with a plurality of work stations (11, 12), which are designed as loading points (14) in this case. The different types of parts (2, 3) can be placed here by one or more workers (24) manually on supports that determine the suitable geometry and clamped. Suitable safety means for the worker (24), e.g., step-activated switching mats, which send a corresponding signal to the robot and plant control when stepped on and interrupt the robot drive during the manual insertion by the worker (24), may be present in this case at the loading points (14) or work stations (11, 12).

The common travel axis (20) is arranged along the work stations (11, 12). A handling robot (18) and a processing robot (19), for example, a welding robot, move next to one another on the common travel axis (20). The welding robot (19) performs the first welding operations on the parts (2, 3) inserted manually at the loading points (14). The handling robot (18) takes over the parts (2, 3) after the completion of the processing and transports them farther into the next processing station (5), which is designed as a so-called respot station for the further welding of the initial tacked parts (2, 3).

The processing stations (4, 5) have a common, continuous travel axis (20) reaching over several stations in this case. As a result, the above-mentioned handling robot (18) can remove the parts (2, 3) from the loading station (4) and bring them directly to the different, type-specific work stations (11, 12) of the respot station (5) and deposit them there. A second handling robot, which ensures the handling the parts (2, 3) in the respot station (5) and, furthermore, the further transportation into the next processing station (6), may be arranged on the common travel axis (20) at the downstream end.

For example, four work stations (11, 12) are arranged in the respot station (5) on both sides of the common central travel axis (20). For clarity's sake, only two of the four work stations (11, 12) are shown in the operating position and with parts (2, 3). As an alternative, the number of work stations (11, 12) may also vary upward or downward. The work stations may also be arranged on one side of the travel axis (20) only.

The processing robots (19) are arranged in the respot station (5) on two additional travel axes (21), which extend along the other rear side of the work stations (11, 12) and in parallel to the common travel axis (20). Furthermore, there also may be additional travel axes in a variant, not shown, which are directed crosswise or in another way and are arranged between the work stations (11, 12) and/or at the front ends thereof. One or more processing robots (19) are arranged in a displaceable manner on these one or more additional travel axes (21).

The handling and processing robots (18, 19) can be separated from one another in space in case of this arrangement, in which case only handling robots (18) are arranged, e.g., on the inner travel axis (20) and only processing robots (19) are arranged on the outer or lateral travel axis or travel axes (21). The running production does not need to be stopped in case of a change from one model to the next or in case of an increase in the number of models. Only one or more work stations are retrofitted while the operation continues to run without utilization at the other work stations (11, 12). This configuration of the plant may be used in case of other stations as well.

At the loading and respot station (4, 5), the common travel axis (20) forms the transfer line (22), and a transfer point (13) is formed with a line offset at the end of the respot station (5). A third processing station (6), which is designed, e.g., as a sealer station, which has a delivery table (16) common for all types of parts (2, 3) and also forms the intermediate storage unit (17) for the transfer of the parts and for the further transportation, is arranged at the transfer point (13). The handling robot (18) arranged at the end of the common travel axis (20) places the parts (2, 3) welded in the respot station (5) on the delivery table (16), and a sealer and a sealing compound or another material is subsequently applied by a processing robot (19), which is arranged, e.g., stationarily, or another processing of the part, which is preferably tolerant or neutral with respect to the type, is carried out.

The next processing station (7) is again designed as a welding station and is arranged offset and separated from the loading and respot station (4, 5). There are two common travel axes (20) in the welding station (7), which are arranged on both sides along a row of work stations (11, 12). Handling and processing robots (18, 19) are arranged displaceably next to each other on both common travel axes (20).

As is illustrated by the transfer point (13) with the intermediate storage unit (17) between the two processing stations (5, 7), a handling robot (18) each, whose working range covers the intermediate storage unit (17), is arranged on the common travel axis (20) of these adjacent stations (5, 7) at the ends. The handling robots (18) thus ensure the transport of the parts at the transfer point (13), bridging over the offset of the lines.

Furthermore, a loading point (14), which is operated by a worker (24) manually, and at which additional small parts or the like are fed and joined with the parts (2, 3), may be present at the welding station (7). On the one hand, the individual handling robot (18) arranged on the upper common travel axis (20) takes over the parts (2, 3) from the sealer station (6) and transports them to the work stations (11, 12) in the welding station (7). In addition, this handling robot (18) transports the additional parts from the loading point (14) to the parts (2, 3) on the work stations (11, 12). The total of three welding robots (19) arranged on the two common travel axes (20) carry out the necessary joining and welding operations on the parts (2, 3) and can reach all work stations (11, 12) for this. An individual handling robot (18), which removes the parts (2, 3) after the welding and brings them to the transfer point (13) for the further transportation, is arranged, in turn, displaceably on the second lower, common travel axis (20) at the downstream end.

The welding station (7) is joined by a buffer storage unit (15), which is designed, e.g., as a belt type storage unit running about vertical axes. It is operated by the above-mentioned handling robot (18) on the lower travel axis (20).

Figure 3:
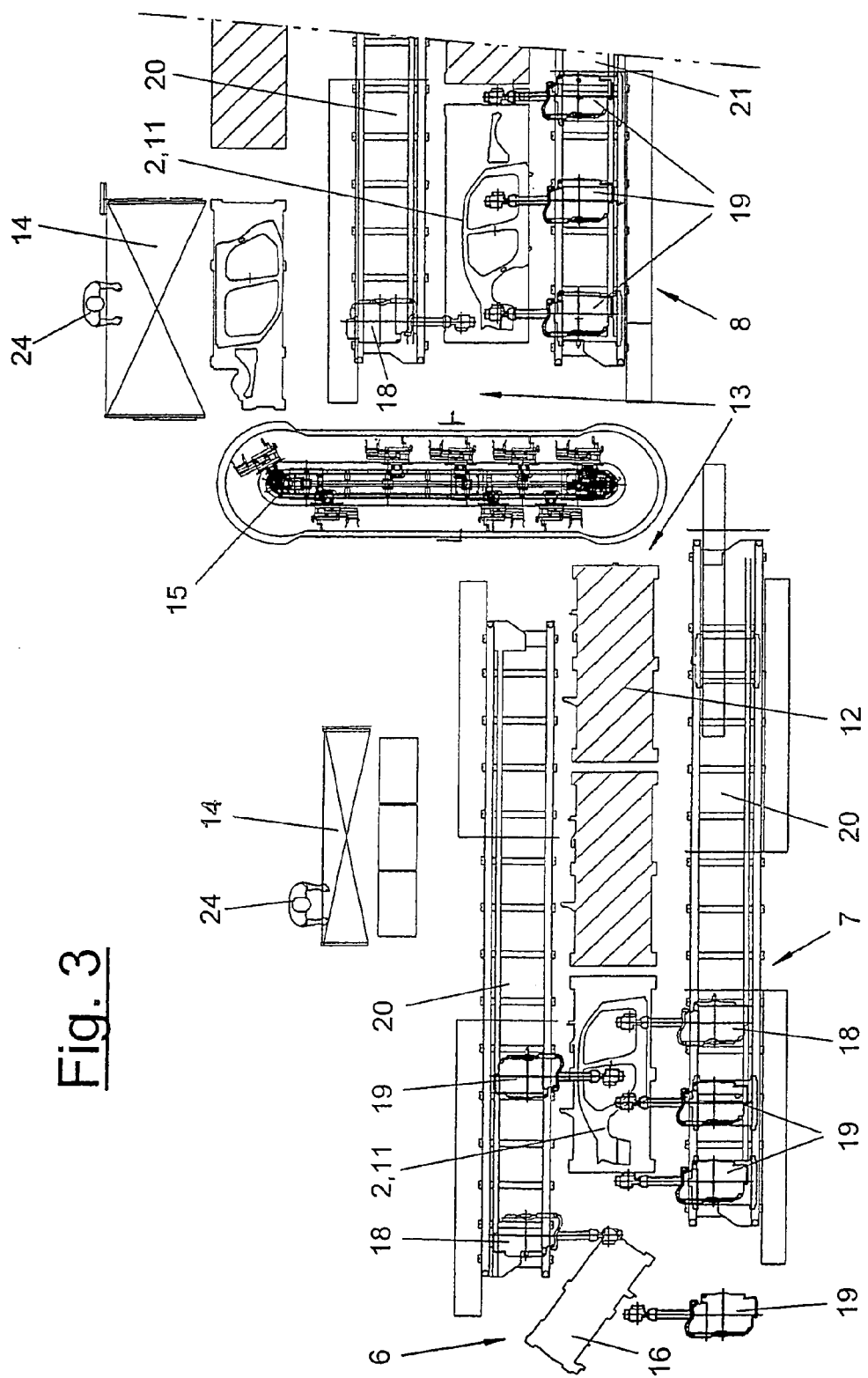
FIG. 3 is an enlarged and cut-away detail of an individual processing station from the manufacturing plant in FIG. 1.
Figure 4:
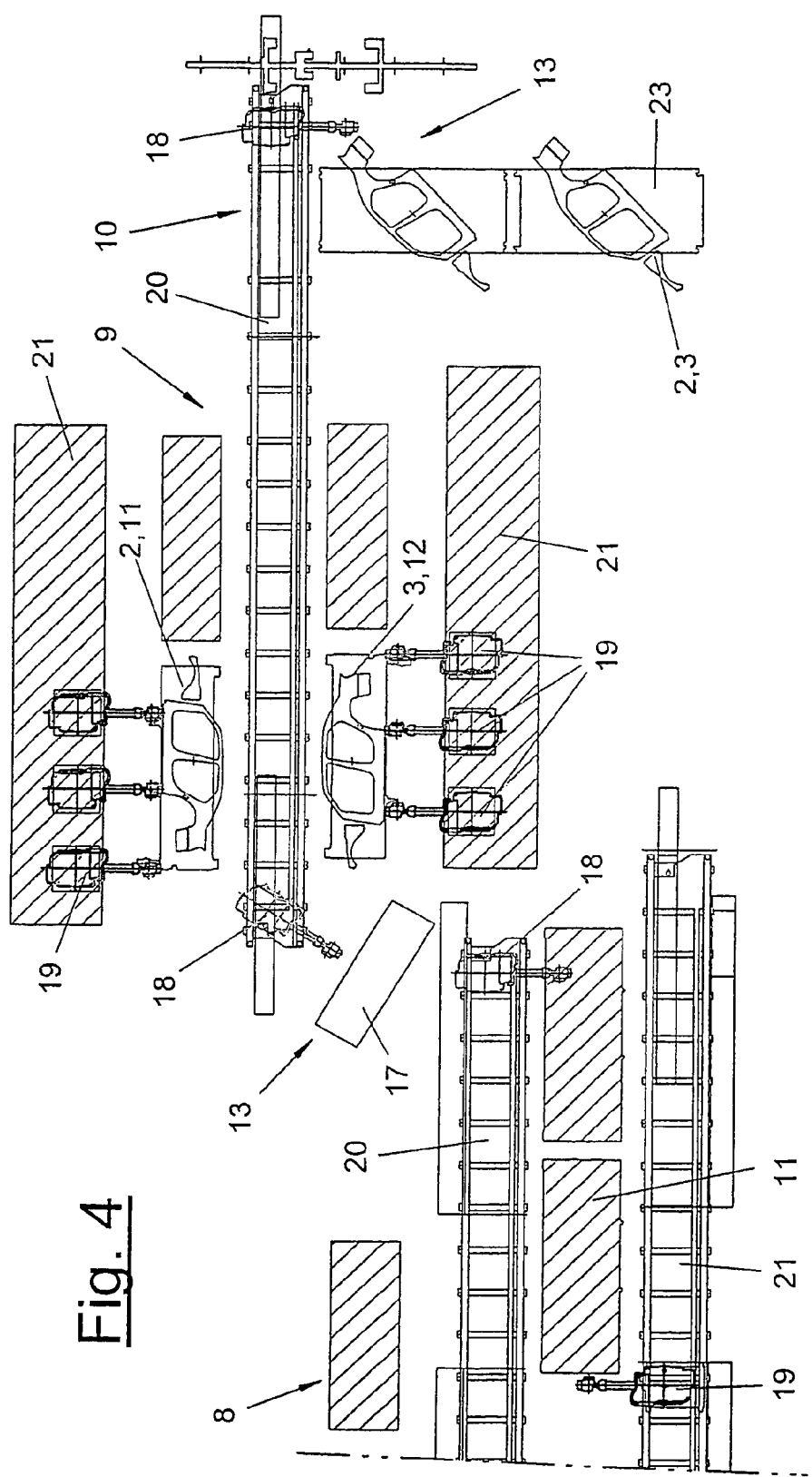
FIG. 4 is an enlarged and cut-away detail of an individual processing station from the manufacturing plant in FIG. 1.

The buffer storage unit (15) is joined by another processing station (8) in the form of a welding station, which has a design similar to that of the above-described welding station (7). Two travel axes (20, 21) are likewise arranged here in parallel and on both sides of a row of work stations (11, 12). FIGS. 3 and 4 show this design of the station with a section line at right angles through the station. Two handling robots (18), which operate independently from one another and also operate a manual loading point (14), at which a worker (24) inserts additional parts to the parts (2, 3), are arranged on the upper travel axis (20) in this case. The upstream handling robot (18) takes over, furthermore, the parts (2, 3) from the buffer storage unit (15). The downstream handling robot (18) ensures the further transportation to an intermediate storage unit (17), which forms the next transfer point (13). Three welding robots (19) are arranged on the lower travel axis (21) displaceably independently from one another in the welding station (7) in this case.

The adjoining processing station (9) is another welding station, in which the working stations (11, 12) are arranged on both sides of a central travel axis (20), on which two handling robots (18) are displaceable independently from one another. The welding robots (19) are positioned on two more travel axes (21) in a triple arrangement each, which extend along the rear sides of the work stations (11, 12). The downstream handling robot (18) takes over the parts (2, 3) from the welding station (9) after the conclusion of the welding operations and transports them to an unloading station (10), in which the transfer to a parts conveyor (23) takes place, with which the parts (2, 3) are removed.

Various modifications of the embodiment shown are possible. Thus, the number, the arrangement and the design of the individual processing stations may vary as desired. This also applies to the number and the arrangement of the travel axes (20, 21) and the robots (18, 19). The type of the processing operations and the design of the transfer points or interfaces are likewise selectable as desired.

While specific embodiments of the invention have been shown and described in detail to illustrate the application of the principles of the invention, it will be understood that the invention may be embodied otherwise without departing from such principles.

The invention claimed is:

1. A manufacturing plant for body part components, the manufacturing plant comprising:
   a plurality of processing stations, which are arranged one after another along a transfer line, and
   a plurality of multiaxial robots, wherein one or more handling robots for transporting the parts are arranged in at least one processing station on at least one travel axis, which extends through a plurality of adjacent processing stations and connects same, and at least one of the processing stations has a plurality of, type-specific work stations for different types of parts of the same kind and one or more additional travel axes for one or more robots, wherein the additional travel axis is arranged on the other side of the work stations and the type-specific work stations are arranged next to one another along the travel axes and can be operated by the robots.

2. A manufacturing plant in accordance with claim 1, wherein said one or more handling robots and one or more processing robots are arranged movably next to one another on one or more common travel axes.

3. A manufacturing plant in accordance with claim 1, wherein the work stations are arranged both sides of a common travel axis.

4. A manufacturing plant in accordance with claim 1, wherein the work stations can be operated jointly by the handling robots and the processing robots.

5. A manufacturing plant in accordance with claim 1, wherein transfer points with intermediate storage units, which are located in the working range of the handling robots, are arranged between the processing stations.

6. A manufacturing plant in accordance with claim 1, wherein a handling robot each is arranged on a common travel axis of adjacent processing stations at ends thereof.

7. A manufacturing plant in accordance with claim 1, wherein one or more processing robots are arranged on the common travel axis between the end-side handling robots.

8. A manufacturing plant in accordance with claim 1, wherein the robots are designed as multiaxial articulated arm robots.

9. A manufacturing plant in accordance claim 1, wherein the robots have a dual function as a handling robot and as a processing robots.

* * * * *